United States Patent [19]

Okumura et al.

[11] Patent Number: 5,789,090
[45] Date of Patent: Aug. 4, 1998

[54] METALLIC THIN-FILM MAGNETIC RECORDING MEDIA

[75] Inventors: Yoshinobu Okumura, Takarazuka; Masahiko Yasui, Neyagawa; Tadashi Akita, Ibaraki; Makoto Maeda, Itami, all of Japan

[73] Assignee: StorMedia, Inc., Santa Clara, Calif.

[21] Appl. No.: 692,491

[22] Filed: Aug. 6, 1996

[30] Foreign Application Priority Data

Feb. 5, 1996 [JP] Japan ................... 8-018701
Jul. 4, 1996 [JP] Japan ................... 8-174842

[51] Int. Cl.$^6$ ........................................ G11B 5/66
[52] U.S. Cl. .................... 428/694 T; 428/694 TS; 428/694 TP; 428/900; 204/192.2
[58] Field of Search .................. 428/694 T, 694 TS, 428/900; 204/694 TP, 192.2

[56] References Cited

U.S. PATENT DOCUMENTS

| | | | |
|---|---|---|---|
| 4,652,499 | 3/1987 | Howard | 428/641 |
| 4,735,853 | 4/1988 | Okudaira | 428/336 |
| 4,743,491 | 5/1988 | Asada et al. | 428/213 |
| 5,037,515 | 8/1991 | Tsai et al. | 204/192.15 |
| 5,302,434 | 4/1994 | Doerner et al. | 428/65.6 |
| 5,413,873 | 5/1995 | Mizukami | 428/611 |
| 5,436,047 | 7/1995 | Howard et al. | 428/64.2 |

FOREIGN PATENT DOCUMENTS

| | | |
|---|---|---|
| 4-241222 | 8/1992 | Japan . |
| 4-255908 | 10/1992 | Japan . |
| 4-255909 | 10/1992 | Japan . |

OTHER PUBLICATIONS

"Side Writing Phenomena in Narrow Track recording", Jian–Gang Zhu and Xiao–Guang Ye; Dept. of Electrical Eng.,Univ. of Minnesota; IEEE Transactions on Magnetics, vol. 28, No. 5, Sept. 1992, pp. 2716–2718.

"Oxidation of Seed–Layer for Improved Magnetics & Recording Performance of Thin–Film Rigid Discs", Nader Mahvan, Eithan Ziera, Atef Eltoukhy; Nashua Computer Products, IEEE Transactions On Magnetics, vol. 29, No. 6, Nov. 1993, pp.3691 –3693.

"NiAl Underlayers For CocrTa Magnetic Thin Films", Li–Lien Lee, David E. Laughlin, David N. Lambeth, Dept. of Elect. & Computer Eng.; Data Storage Systems Center; IEEE Transactions On Magnetics, vol. 30, No. 6, Nov. 1994 pp. 3951 –3953.

"Effects of Cr Intermediate Layers on CoCrPt Thin Media on NiAl Underlayers Li–Lien Lee et al.; Data Storage Systems Center, Pittsburgh, PA USA; IEEE Transactions On Magnetics, vol. 31, No. 6 1995, pp 2728 –2730.

*Primary Examiner*—Leszek Kiliman
*Attorney, Agent, or Firm*—Armstrong ,Westerman, Hattori, Mcleland & Naughton

[57] ABSTRACT

A metallic thin-film magnetic recording medium which is enhanced in coercive force, diminished in nonlinear waveform interference through controlled magnetic anisotropy and adapted to a higher recording density. A seed layer of a crystalline Cr—Ni alloy is formed between the substrate of the medium and a Cr ground layer, whereby the crystal orientation of a magnetic layer is substantially (100) orientation. The crystalline alloy includes an alloy consisting essentially of 36 to 46 atomic % of Ni and the balance substantially Cr, or an alloy consisting essentially of 36 to 46 atomic % of Ni, 0.5 to 3 atomic % of W or Mo or combination thereof and the balance substantially Cr.

7 Claims, 10 Drawing Sheets

1

METALLIC THIN-FILM MAGNETIC RECORDING MEDIA

FIELD OF THE INVENTION

The present invention relates to magnetic recording media for use in magnetic disk devices such as hard disks, and more particularly to metallic thin-film magnetic recording media which are outstanding in magnetic characteristics and recording-reproduction characteristics.

DESCRIPTION OF THE RELATED ART

With reference to FIG. 11, metallic thin-film magnetic recording media for use in hard disks generally have a substrate 2 composed of a nonmagnetic base layer 21 of Al alloy and an amorphous NiP layer 22 formed on the base layer 21, and comprise a ground layer 4 substantially of Cr, a magnetic layer 5 of Co alloy and a protective film 6 of carbon which are successively superposed on the substrate 2.

It is presently desirable that metallic thin-film magnetic recording media have improved recording resolution by providing increases in recording density (especially, track recording density) and accordingly a greater coercive force and lower noise characteristics. On the other hand, increases in track recording density lead to nonlinear waveform interference which are not removable, for example, by linearization, consequently entailing an impaired recording resolution.

The surface of the substrate is often formed with minute indentations or projections, i.e., so-called texture, circumferentially thereof to reduce the friction between the head and the medium. The texture increases the circumferential magnetic anisotropy of the Co alloy magnetic layer and is therefore known to be effective also for providing giving an enhanced coercive force. However, the increased magnetic anisotropy tends to result in greater nonlinear waveform interference.

Low noise characteristics are also required of metallic thin-film magnetic recording media due to improvement in track density. It is important to mitigate the medium noise at the track edges for this purpose, whereas the medium noise tends to increase because of the circumferential magnetic anisotropy.

If the substrate is not textured circumferentially thereof in order to diminish the nonlinear waveform interference and to prevent the increase of medium noise, the magnetic anisotropy disappears from the magnetic layer, but the recording medium then cannot provide the desired coercive force.

Although it is effective to add Pt to the Co alloy for the magnetic layer to provide an enhanced coercive force without texturing, the addition of Pt increases the target cost of the sputtering apparatus and results in the problem of increased medium noise.

SUMMARY OF THE INVENTION

An object of the present invention is to provide a metallic thin-film magnetic recording medium having an enhanced coercive force without adding Pt to the magnetic layer, even when its magnetic layer has decreased there is no circumferential magnetic anisotropy and which simultaneously has reduced noise resulting from diminished nonlinear waveform interference.

To fulfill the above object, the present invention provides a magnetic recording medium of the type described wherein an optimized seed layer prepared from a crystalline alloy is interposed between the substrate and the Cr ground layer.

The crystalline alloy forming the seed layer includes, for example, an alloy consisting essentially of 36 to 46 atomic % of Ni and the balance substantially Cr, or an alloy consisting essentially of 36 to 46 atomic % of Ni, 0.5 to 3% of W or Mo or combination thereof, and the balance substantially Cr.

DETAILED DESCRIPTION OF THE PREFERRED EMBODIMENTS

Figure 1:
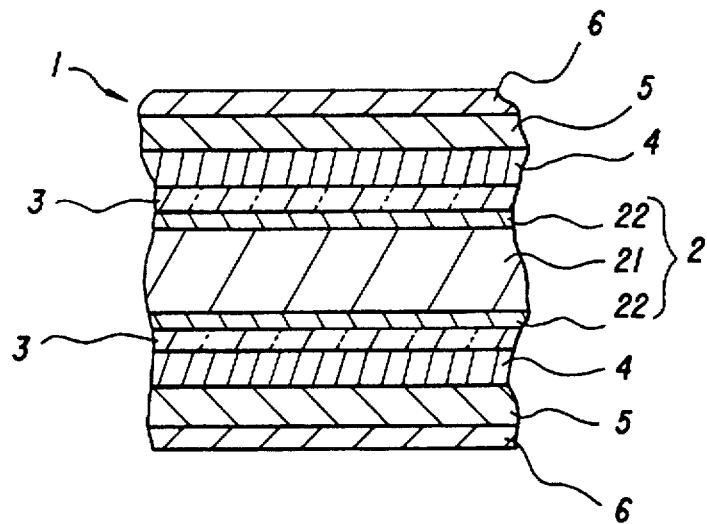
FIG. 1 is a fragmentary sectional view of a metallic thin-film magnetic recording medium having a crystalline Cr—Ni seed layer.

FIG. 1 shows a recording medium 1 of one embodiment of the present invention which comprises a substrate 2 composed of a base layer 21 of Al alloy or glass and an NiP layer 22 formed on the layer 21, a seed layer 3 formed of a crystalline alloy and provided on the substrate 2 according to the invention, and a ground layer 4, magnetic layer 5 and protective film 6 superposed on the seed layer 3 in this order. The medium of FIG. 1 has the NiP layer 22, crystalline alloy seed layer 3, ground layer 4, magnetic layer 5 and protective film 6 formed on each side of the base layer 21 symmetrically so that opposed surfaces of the medium are usable for writing and reading, whereas these layers can be formed only on one side to use only one surface of the medium for writing and reading.

In the case where an Al alloy is used for forming the base layer 21 of the substrate 2, the amorphous NiP layer 22 is usually formed on the layer to give rigidity to the base layer 21 and to improve the crystalline orientation of the ground layer, so that the crystalline alloy seed layer 3 is formed on the NiP layer 22 (see FIG. 1).

The substrate 2 including the NiP layer 22 may be textured circumferentially thereof to reduce the friction between the medium and the head. On the other hand, when the magnetic recording medium 1 needs to be made planar so as to render the head floatable to a lower level, the substrate can be superfinished to form a surface of superhigh smoothness.

Figure 2:
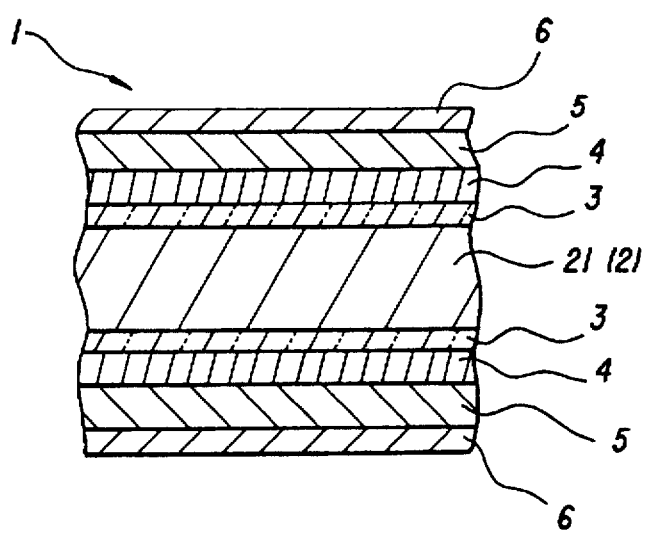
FIG. 2 is a fragmentary sectional view of another metallic thin-film magnetic recording medium embodying the invention.

In the case where glass is used for making the base layer 21 of the substrate 2, the NiP layer 22 may be dispensed with since glass has high rigidity. In this case, the crystalline alloy seed layer 3 is formed directly on the base layer 21 (see FIG. 2). The NiP layer 22 may be provided even in the case where glass is used. In this case, the crystalline alloy seed layer 3 is formed on the NiP layer 22 as in the foregoing case of the Al alloy base layer.

The crystalline alloy seed layer 3 preferably has a thickness of about 100 to about 1000 angstroms. If the thickness is too small, the seed layer 3 fails to fully exhibit the desired effect, whereas if the thickness is greater than the above range, the Cr ground layer 4 and the Co alloy magnetic layer 5 to be superposed thereon will increase in grain size thereby causing an increase noise.

The Cr ground layer 4 to be formed on the seed layer 3 is preferably 200 to 1000 angstroms, more preferably 400 to 800 angstroms, in thickness for the following reason. Even when the thickness of the ground layer 4 is greater than about 800 angstroms, a further improvement will not be expectable in the coercive force of the recording medium 1. If the thickness is greater than 1000 angstroms, the Co alloy magnetic layer 5 to be formed thereon will be composed of coarser crystals thereby resulting in increased noise.

The ground layer 4 is made substantially from Cr as is already known. The Cr content need not be 100% but there should be at least about 95% of Cr present.

The magnetic layer 5 is made from a known Co alloy consisting mainly of Co.

The NiP layer 22, crystalline alloy seed layer 3, ground layer 4, magnetic layer 5 and protective film 6 can be formed, for example, by D.C. sputtering, plating or vacuum deposition, as is already known.

In order to provide the desired crystalline orientation to the Cr ground layer 4 to be formed on the crystalline Ni—Cr alloy seed layer 3, it is preferable to form the ground layer 4 with the seed layer 3 and the NiP layer 22 heated to about 250° C. to about 300° C. by an infrared heater.

The provision of the crystalline alloy seed layer 3 between the substrate 2 and the Cr ground layer 4 provides (110)+(211) orientation to the crystals of the Cr ground layer 4 to be formed on the layer 3 and further (100) orientation to the crystals of the Co alloy magnetic layer 5 to be formed on the ground layer 4 (To be exact, a very small amount of (101) is also present). Thus, the crystals of the Co alloy magnetic layer 5 are given a substantially (100) orientation and rendered finer, whereby a great coercive force is made available.

A crystalline alloy consisting essentially of, in atomic %, 36 to 46% of Ni, and the balance substantially Cr, is used for the seed layer. The inclusion of 36 to 46 atomic % of Ni is considered to be a preferable range for obtaining a great coercive force. In this regard, 38 to 44 atomic % of Ni is more preferable.

An alloy consisting essentially of, in atomic %, 36 to 46% of Ni, 0.5 to 3% of W or Mo or combination thereof, the balance being substantially Cr may also be used as the crystalline alloy for the seed layer. The inclusion of at least 0.5% of W or Mo is intended to further improve the (100) crystal orientation and to render the magnetic layer finer. If there is too much W or Mo, however, the crystalline structure becomes amorphous, and therefore the upper limit of W or Mo is defined as 3%. If W and Mo are both used, a combined amount of these elements should be also 0.5 to 3%.

Even when the substrate is textured, the presence of the seed layer between the substrate and the Cr ground layer reduces the magnetic anisotropy of the magnetic layer. Consequently, the increase of the medium noise due to the magnetic anisotropy is suppressed, and nonlinear waveform interference can also be diminished.

The circumferential texture formed on the substrate imparts to the Co alloy magnetic layer an increased circumferential magnetic anisotropy, which conventionally gives rise to the problem that the coercive force becomes greater in the circumferential direction than in the radial direction. Although the presence of the seed layer provides a great coercive force according to the present invention, the coercive force in the circumferential direction becomes approximately equal to that in the radial direction, with the result that the magnetic recording medium available is nearly unity in OR (orientation ratio) representing the anisotropy of the coercive force. Expressed by OR is a ratio of the circumferential coercive force of the metallic thin-film type magnetic recording medium to the radial coercive force thereof (that is, circumferential coercive force/radial coercive force). The value of an OR which is closer to unity means that the influence of the circumferential magnetic anisotropy is controlled to a greater extent. The side fringes of the recording medium are then smaller, and the medium noise is also diminished. Incidentally, the term "coercive force" used in this application indicates a circumferential force unless otherwise specified.

EXAMPLE 1

This example investigation the relationship between the seed layer and the coercive force for the crystalline alloy.

Sample media were prepared by forming layers on a substrate having no texture, under the conditions given below. Cr ground layers of varying thickness were formed to establish the relationship between the thickness of the ground layer and the coercive force Hc. The D.C. sputtering apparatus was used for forming the layers.

[Preparation of Sample Media (a)]
(1) Substrate
  Base layer: Al alloy (3.5 inches–31.5 mils)
  NiP layer: 10 μm in thickness
  Surface treatment: finished to superhigh smoothness
  Roughness: Ra=10 Å
(2) Seed layer of crystalline alloy
  Composition: 40 atomic % Ni, the balance Cr
  Thickness: 400 Å
(3) Ground layer
  Composition: substantially Cr
  Thickness: 300 Å, 400 Å, 600 Å, 800 Å and 1000 Å
  Temperature of substrate heated during forming: 260° C.
  Bias voltage for forming: –200 V
(4) Magnetic layer
  Composition: in atomic %, 14% Cr, 6% Ta, the balance substantially Co
  Thickness: 250 Å

Bias voltage for forming: −200 V

Residual magnetic flux density (Br δ): 140 G μ

(5) Protective film

Thickness: 120 Å

Composition: Substantially C

[Preparation of Comparative Media (x)]

For comparison, comparative media (x) having no seed layer were prepared under the same conditions as the sample media (a) except that no seed layer was formed and the ground layer was 400 Å, 600 Å, or 900 Å in thickness.

Figure 3:
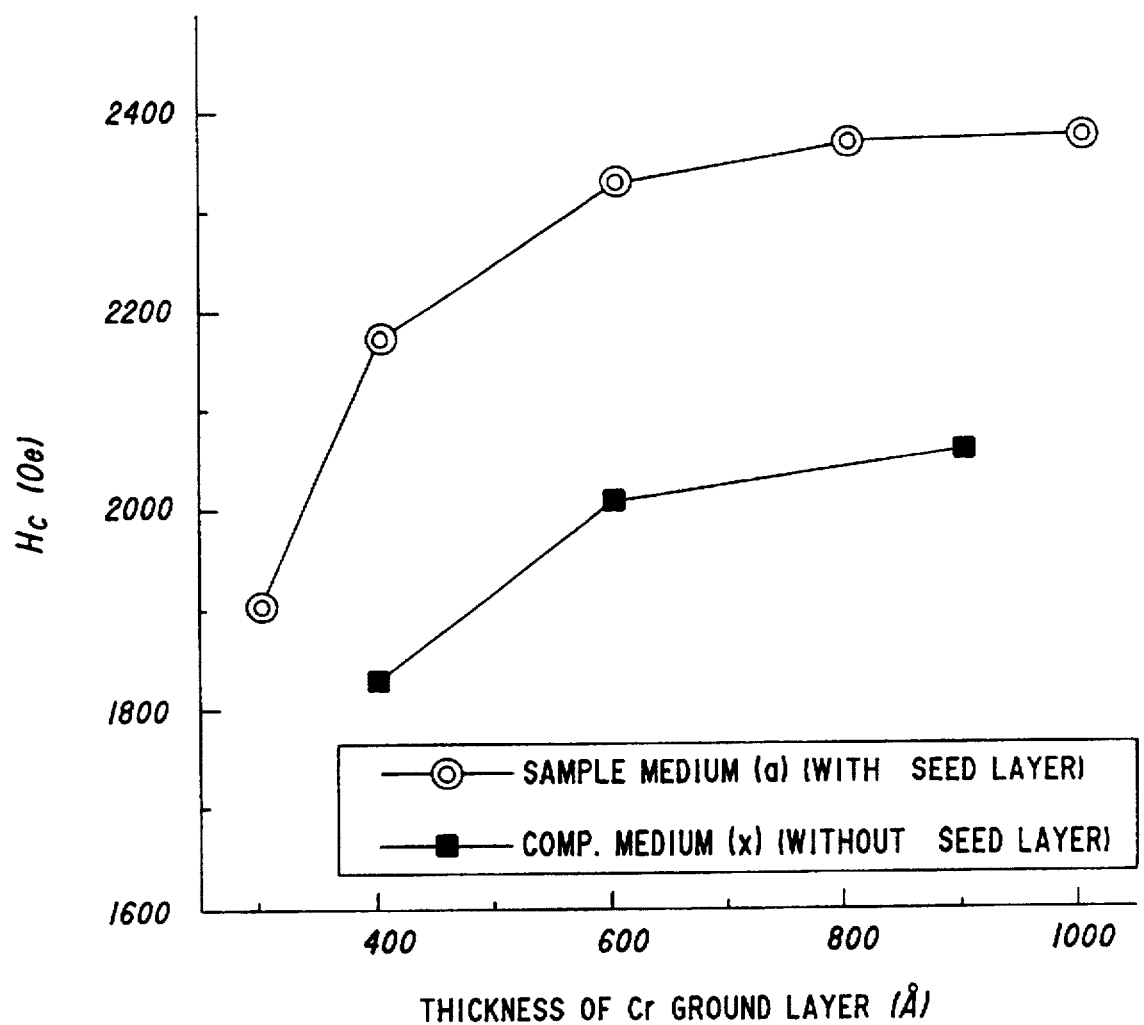
FIG. 3 is a graph showing the relationship between the thickness of ground layer and the coercive force for the sample media (a) and the comparative media (x)

FIG. 3 shows the measurements of coercive force Hc obtained for the sample media (a) and the comparative media (x). It is seen that the provision of the crystalline Cr—Ni seed layer improves the coercive force Hc by about 20% when the thickness of the Cr ground layer is unaltered. The graph also shows that the coercive force Hc of the sample medium (a) increases with an increase in the thickness of the Cr ground layer and nearly levels off when the ground layer thickness exceeds about 800 angstroms.

EXAMPLE 2

Sample media (b) were prepared under the conditions given below and checked for the coercive force Hc and OR resulting from the provision of the seed layer of crystalline alloy, for comparison with comparative media (y). The layers were formed using the D.C. sputtering apparatus.

[Preparation of Sample Media (b)]

(1) Substrate

Base layer: Al alloy (3.5 inches–31.5 mils)

NiP layer: 10 μm in thickness

Surface treatment: texturing

Roughness: Ra=29 Å

(2) Crystalline Cr—Ni alloy seed layer

Same as in Example 1.

(3) Ground layer

Same as in Example 1.

(4) Magnetic layer

Composition: in atomic %, 12% Cr, 6% Ta, the balance substantially Co

The other conditions were the same as in Example 1.

(5) Protective film

Same as in Example 1.

[Preparation of Comparative Media (y)]

For comparison, comparative media (y) having no seed layer were prepared under the same conditions as the sample media (b) except that no seed layer was formed and that the ground layer was 400 Å, 600 Å and 900 Å in thickness.

Figure 4:
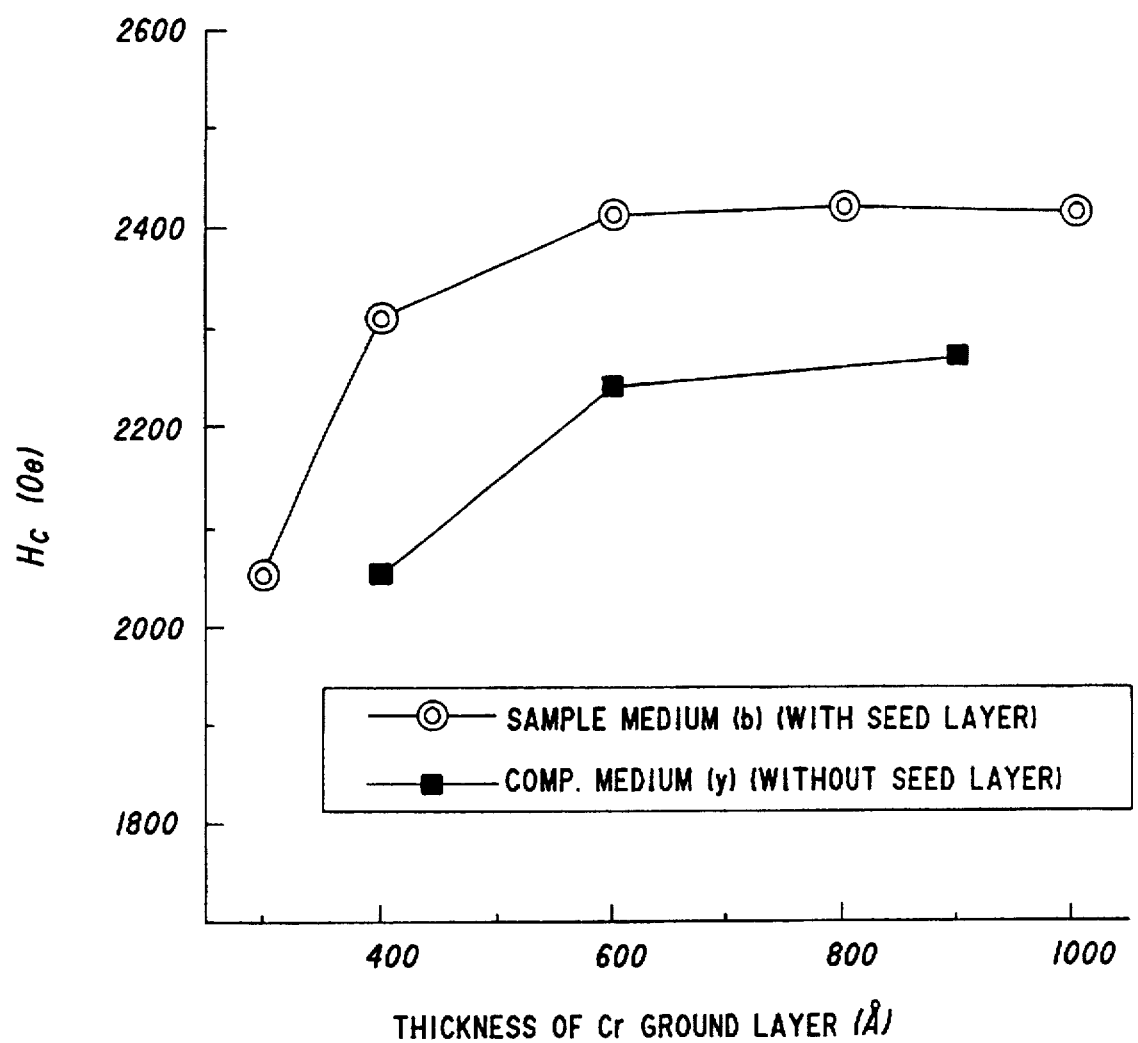
FIG. 4 is a graph showing the relationship between the thickness of ground layer and the coercive force for the sample media (b) and the comparative media (y)

FIG. 4 shows the measurements of coercive force Hc obtained for the sample media (b) and the comparative media (y). The graph reveals that the provision of the crystalline seed layer improves the coercive force Hc by about 10% when the thickness of the Cr ground layer is unaltered. The graph also indicates that the coercive force Hc of the sample media (b) increases with an increase in the thickness of the Cr ground layer and nearly levels off when the ground layer thickness exceeds about 600 angstroms.

Figure 5:
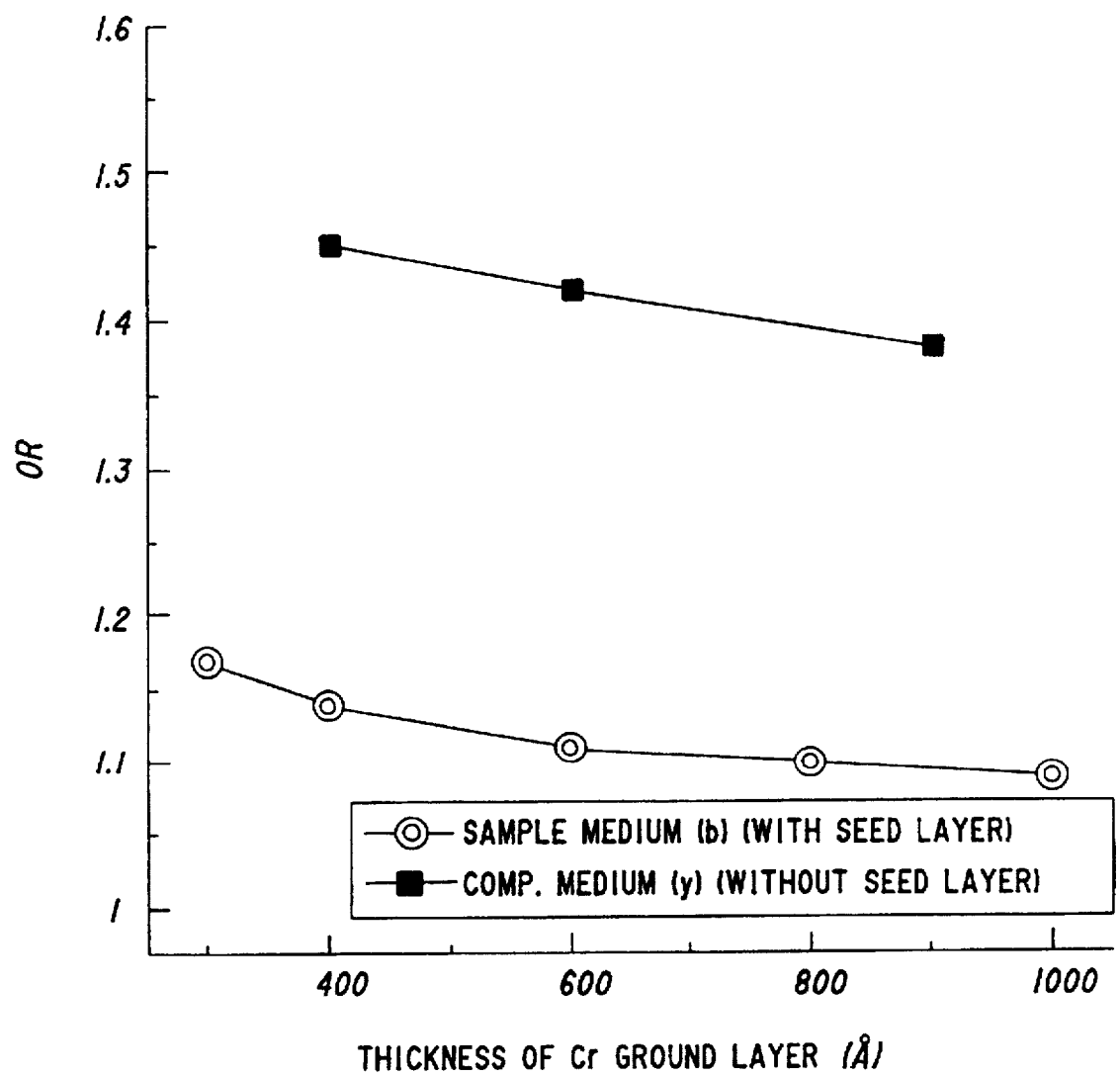
FIG. 5 is a graph showing the relationship between the thickness of ground layer and the OR for the sample media (b) and the comparative media (y)

FIG. 5 shows the ORs obtained for the sample media (b) and the comparative media (y). It is seen that any of the sample media (b) is approximate to 1 in the OR value unlike the comparative media (y), controlled in circumferential magnetic anisotropy and improved with respect to side fringes and medium noise. The graph also reveals that the OR value of the sample media (b) decreases with an increase in the thickness of the Cr ground layer and that the effect to improve the OR almost levels off when the ground layer thickness exceeds about 600 angstroms.

EXAMPLE 3

Next, sample media (c) were prepared which were different in the Ni concentration of crystalline Cr—Ni alloy forming the seed layer. The media were checked for coercive force Hc for the varying concentrations. The layers were formed using the D.C. sputtering apparatus.

[Preparation of Sample Media (c)]

(1) Substrate

Base layer: Al alloy (3.5 inches–31.5 mils)

NiP layer: 10 μm in thickness

Surface treatment: texturing

Roughness: Ra=29 Å

(2) Seed layer of crystalline alloy

Composition: 30–60 atomic % Ni (see FIG. 6), the balance Cr

Thickness: 400 Å

(3) Ground layer

Thickness: 400 Å

The other conditions were the same as in Example 1.

(4) Magnetic layer

Composition: in atomic %, 12% Cr, 6% Ta, the balance substantially Co

The other conditions were the same as in Example 1.

(5) Protective film

Same as in Example 1

Figure 6:
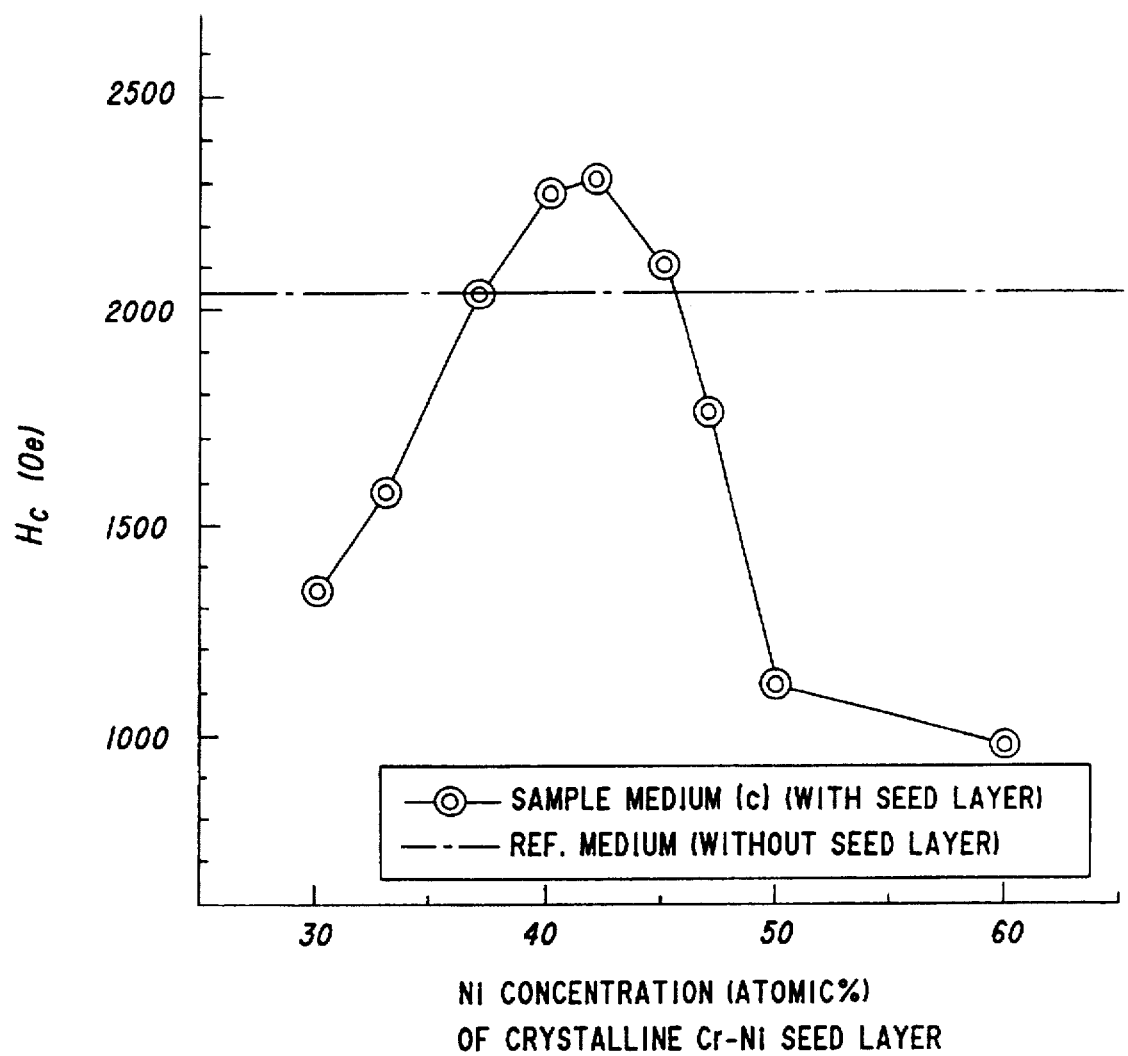
FIG. 6 is a graph showing the relationship between the Ni concentration of the crystalline Cr—Ni alloy forming the seed layer and the coercive force.

FIG. 6 shows the measurements of coercive force Hc obtained for the sample media (c) varying over the range of 30 to 60 atomic % in the Ni concentration of the crystalline Cr—Ni alloy forming the seed layer. For reference, the graph also shows in a broken line the coercive force Hc of a magnetic recording medium prepared under the same conditions as above except that no seed layer was formed. FIG. 6 reveals that the coercive force Hc is greater than typical when the Ni content of the seed layer is in the range of about 36 to about 46 atomic %, and is about 10% greater than typical especially when the content is in the range of about 38 to about 44 atomic %.

EXAMPLE 4

Figure 7:
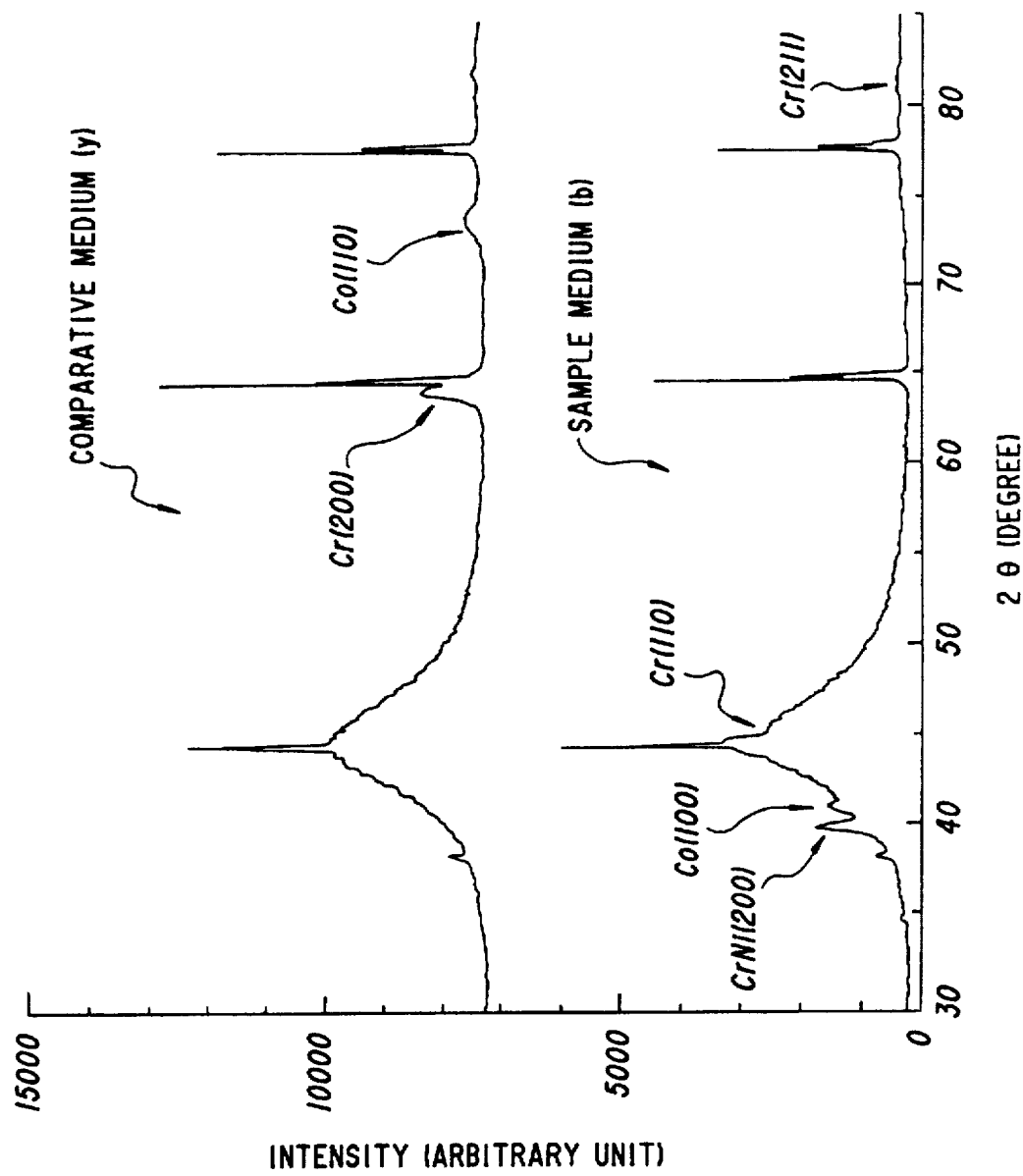
FIG. 7 is a graph showing the result obtained by subjecting one of the sample media (b) and the comparative media (y) to the X-ray diffraction method.

Of the sample media (b) and the comparative media (y) prepared in Example 2, the media wherein the ground layer was 400 angstroms in thickness were checked by the X-ray diffraction method. The results are shown in FIG. 7, which reveals that the crystals of the Cr ground layer 4 of the sample medium (b) have (110)+(211) orientation and further that the crystals of the Co alloy magnetic layer 5 formed on the ground layer 4 have (100) orientation. (There also exists a very small amount of (101) orientation although it is not readily identified from FIG. 7.) The numerical values indicating intensities along the ordinate are in an arbitrary unit.

EXAMPLE 5

Recording media were prepared under the following conditions and tested for recording-reproduction characteristics using an MR head. If having different magnetic characteristics, the recording media would exhibit different recording-reproduction characteristics, so the bias voltage and the substrate temperature were altered for adjustment when forming the Co magnetic layers so as to give the media a coercive force Hc of about 2000 Oe and residual magnetic flux density Br δ of about 140 G μ.

[Preparation of Recording Media for Testing]

No. 1 Sample medium (a) prepared in Example 1, 400 Å in the thickness of the seed layer and 400 Å in the thickness of the ground layer No. 2 Sample medium (a) prepared in Example 1, 600 Å in the thickness of the seed layer and 400 Å in the thickness of the ground layer No. 3 Recording medium prepared under the conditions of Example 1 and having a 400-angstrom-thick seed layer with an Ni concentration of 42 atomic % and a 400-angstrom-thick ground layer No. 4 Comparative medium (x) (comparative example) prepared in Example 1 and 400 Å in the thickness of the ground layer Table 1 shows the recording-reproduction characteristics of these recording media. In Table 1, TAA stands for the output, SNm for the ratio of the signal strength to the medium noise, and Nm for the medium noise.

TABLE 1

| No. | Seed layer | | Magnetic characteristics | | Recording-reproduction characteristics | | |
|---|---|---|---|---|---|---|---|
| | Composition | Thickness (Å) | Hc (Oe) | Br δ (Gμ) | TAA (μV) | SNm (dB) | Nm (μV) |
| 1 | Cr-40 Ni | 400 | 2020 | 142 | 430 | 34.9 | 7.76 |
| 2 | Cr-40 Ni | 600 | 1990 | 143 | 426 | 34.1 | 7.83 |
| 3 | Cr-40 Ni | 400 | 2010 | 145 | 445 | 35.7 | 7.77 |
| 4 | None (comp. ex.) | | 1970 | 139 | 385 | 33.7 | 7.82 |

With reference to the recording-reproduction characteristics given in Table 1, the magnetic recording media No. 1 to No. 3 of the present invention having the crystalline Cr—Ni seed layer are comparable to the comparative example, i.e., magnetic recording medium No. 4, in noise (Nm) but are superior thereto with respect to the output (TAA) and the signal-to-noise ratio (SNm).

On the other hand, magnetic recording media were separately prepared with the crystalline alloy replaced by an amorphous alloy for the Cr—Ni seed layer. When checked, the Cr crystals of the ground layers and the Co crystals of the magnetic layers were found to have (200) orientation and (110) orientation, respectively. The measurements of OR were as great as 1.4 to 2.0. Since the substrates were textured, the great OR values are thought attributable to the influence of the texture. When the Cr—Ni seed layer is crystalline, on the other hand, the OR value is less than about 1.2 as previously mentioned even if the substrate is textured. This indicates that the media having this type of seed layer are almost free of the influence of the texture, with the influence of the circumferential magnetic anisotropy controlled.

EXAMPLE 6

This example investigates the relationship between the residual magnetic flux density Br δ(δ is a thickness of magnetic layer) and the coercive force Hc and OR by using the crystalline Cr—Ni—W alloy and Cr—Ni—Mo alloy as the seed layer.

Al—NiP substrates (Ra=28 Å) with textured surfaces were formed thereon crystalline seed layer having different compositions (No.5 Cr59Ni40W1; No.6 Cr58Ni40Mo2; No.7 Cr60Ni40) by the use of the D.C. sputtering apparatus.

Next, the ground layer of pure Cr and then the magnetic layer of Co83.5Cr10.5Ta6 were superposed on the substrates by sputtering under the condition of bias voltage −200V and substrate temperature 260° C. A large number of units of sample media which vary in the residual magnetic flux density of the magnetic layer were prepared with non-variable 400 angstroms thickness of Cr ground layer and by changing the the magnetic layer thickness.

For comparison, a sample medium (No.8) having no seed layer on the substrate was also prepared in the same manner as described in the above.

Figure 8:
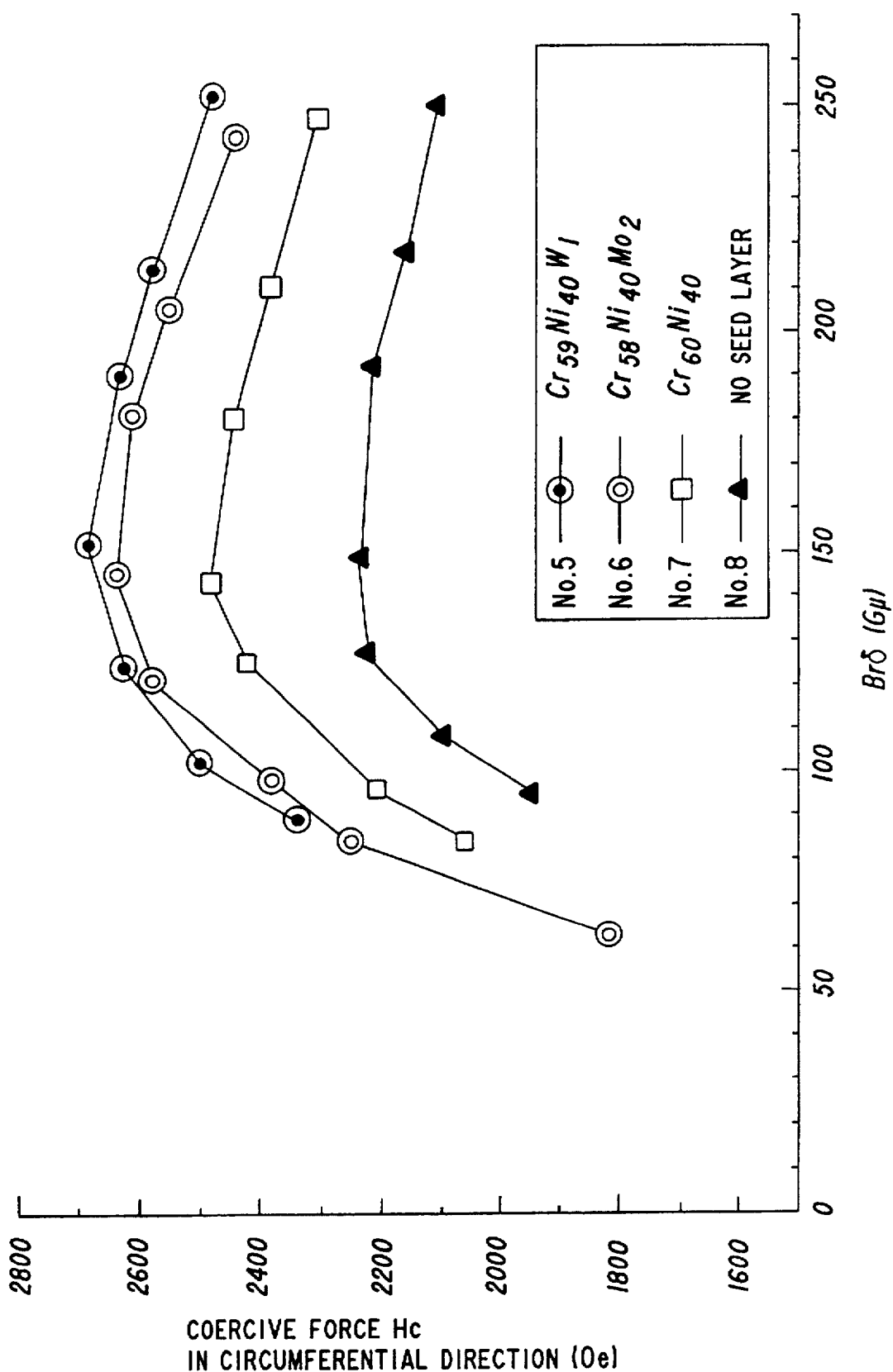
FIG. 8 is a graph showing the relationship between the residual flux density and the coercive force for the sample media.

Both the circumferential coercive force and the radial coercive force were measured with respect to each of the sample media thus obtained. The relationship between the residual magnetic flux density Br δ and the circumferential coercive force Hc is shown in FIG. 8. On the other hand, FIG. 9 shows the relationship between the residual magnetic flux force Br δ and the OR (circumferential coercive force/ radial coercive force) obtained by calculation.

Figure 9:
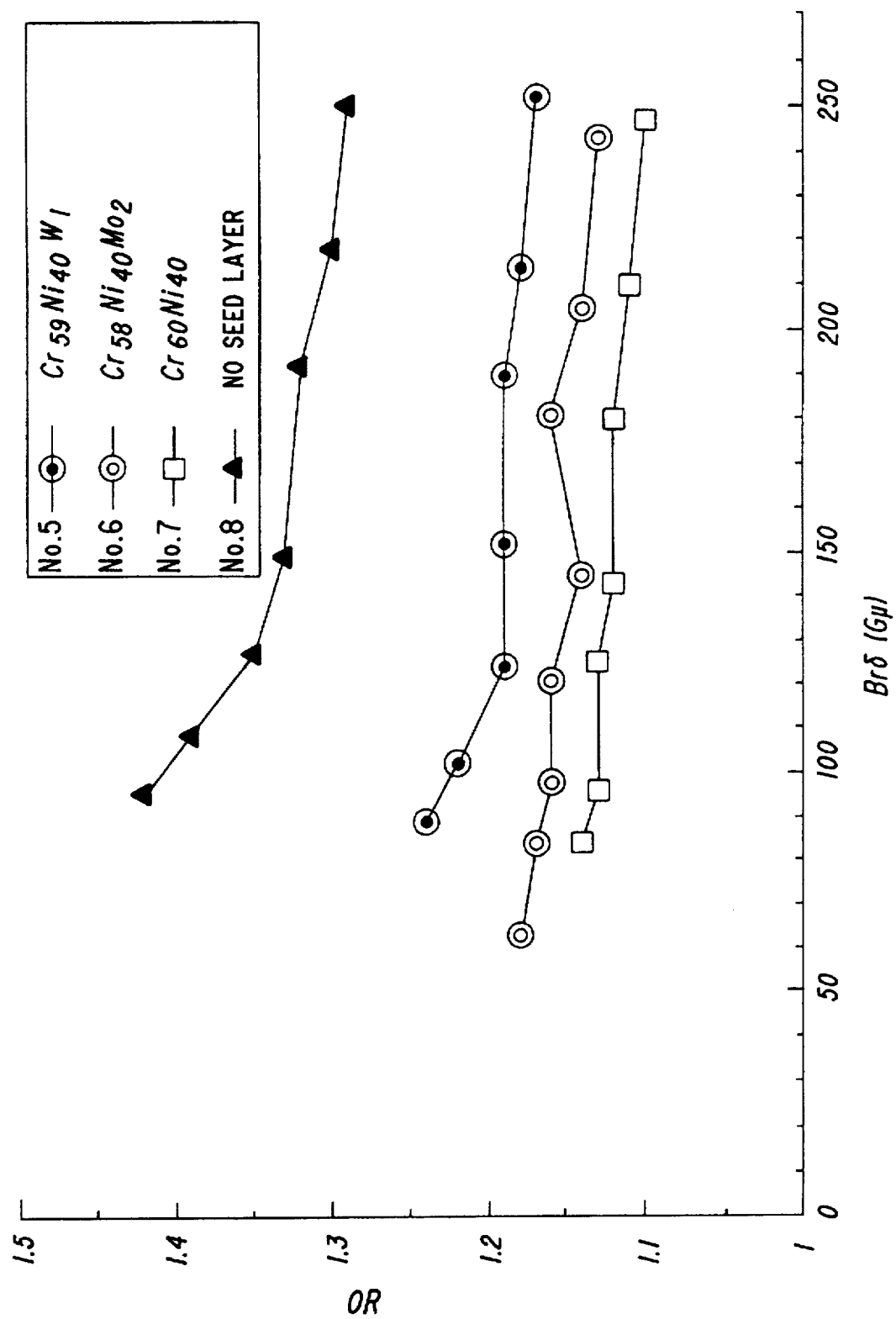
FIG. 9 is a graph showing the relationship between the residual flux density and the OR for the sample media and comparative media.

As seen from FIGS. 8 and 9, the sample media Nos. 5, 6 and 7 were higher with respect to the circumferential coercive force and had values closer to 1 with respect to OR, in comparison with the sample medium No. 8.

Of the sample media having the seed layer formed on the substrate, there is revealed that the sample media Nos.5 and 6 having the seed layer containing W or Mo in addition to Cr and Ni are higher with respect to the coercive force, as compared with the sample medium No. 7 having the seed layer consisting of Cr and Ni. It is thus considered that the use of crystalline alloy containing W and/or Mo in addition to Cr and Ni as the seed layer leads to further improvement of (100) orientation and to the finer crystals of the magnetic layer.

EXAMPLE 7

This example investigates the recording-reproduction characteristics of the recording media prepared in the example 6. Different magnetic properties of the recording media provide different recording-reproduction characteristics, so that the sample media having residual magnetic flux density Br δ of about 220 G μ were selected for testing, and the bias voltage and the substrate temperature were altered for adjustment when forming the magnetic layers so as to give the media a coercive force Hc of about 2200 Oe.

The recording-reproduction characteristics were measured using PHS head made by Silmag Corporation. The results of the measurement are shown in Table 2.

TABLE 2

| No. | Composition of seed layer (atomic %) | Magnetic characteristics | | Recording-reproduction characteristics | | |
|---|---|---|---|---|---|---|
| | | Hc (Oe) | Br δ (Gμ) | SNm (dB) | Nm (μVrms) | NLTS (%) |
| 5 | Cr59Ni40W1 | 2205 | 221 | 28.5 | 2.0 | 4.1 |
| 6 | Cr58Ni40Mo2 | 2215 | 219 | 27.9 | 2.1 | 4.2 |
| 7 | Cr60Ni40 | 2207 | 223 | 27.3 | 2.3 | 4.0 |
| 8 | No seed layer | 2181 | 224 | 25.3 | 3.4 | 5.3 |

In Table 2, SNm stands for the ratio of the signal strength to the medium noise, and Nm for the medium noise. NLTS is a non-linear transition shift which represents a displacement of magnetization transition area of the medium to be subsequently written therein. In this regard, the displacement occurs as a result of the leakage of magnetic field on the recorded pattern having an effect on the recording field of the magnetic head.

With reference to the results of the recording-reproduction characteristics in Table 2, sample media No. 5 to No. 7 having the crystalline seed layer formed thereon are superior to the sample medium No. 8 having no seed layer, with respect to all of the characteristics, i.e., SNm, Nm and NLTS, from which improvement of the recording-reproduction characteristics is understood. With regard to this recording-reproduction characteristics, there is no significant difference between the sample media Nos. 5 and 6 having seed layer including W or Mo, and the sample medium No. 7 having seed layer not including W or Mo.

EXAMPLE 8

This example investigates an effect of negative bias voltage applied for the substrate when the seed layer is formed.

[Preparation of Sample Media]
(1) Substrate
  Base layer: Al alloy (3.5 inches–31.5 mils)
  NiP layer: 10 µm in thickness
  Surface treatment: texturing
  Roughness: Ra=28 Å
(2) Seed layer of crystalline alloy
  Composition: 40 atomic % Ni, the balance Cr
  Thickness: 400 Å
  Bias voltage applied for the substrate when the seed layer is formed: 0V, -100V, -200V, -300V
(3) Ground layer
  Composition: substantially Cr
  Thickness: 600 Å
  Temperature of substrate heated during forming: 260° C.
  Bias voltage for forming: -200 V
(4) Magnetic layer
  Composition: in atomic %, 10.5% Cr, 6% Ta, the balance substantially Co
  Thickness: 400 Å
  Bias voltage for forming: -200 V
(5) Protective film
  Thickness: 120 Å
  Composition: Substantially C The results of the measurement of coercive force Hc obtained for the sample media (No.11 to No. 14) are shown in Table 3.

TABLE 3

| No. | Bias voltage (V) | Coercive force Hc (Oe) |
|---|---|---|
| 11 | 0 | 2220 |
| 12 | -100 | 2300 |
| 13 | -200 | 2310 |
| 14 | -300 | 2320 |

Table 3 reveals that the coercive force improves as the negative bias voltage to be applied for the substrate becomes large.

Figure 10:
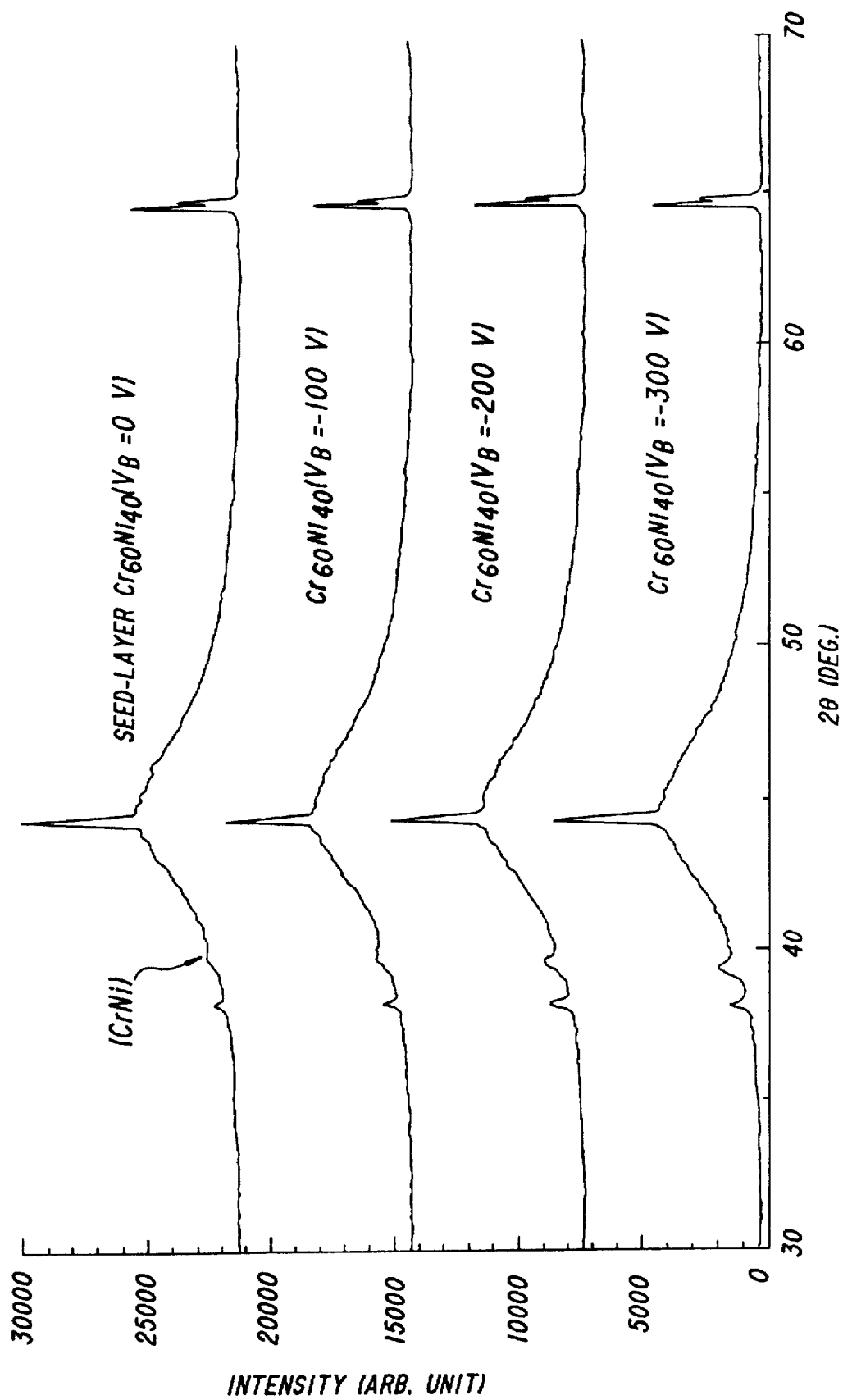
FIG. 10 is a graph showing the result obtained by subjecting the sample media and comparative media to the X-ray diffraction method.
Figure 11:
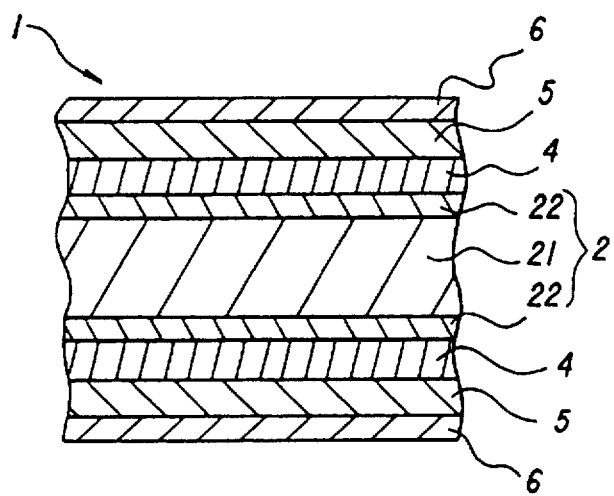
FIG. 11 is a fragmentary sectional view of a conventional magnetic recording medium of the metallic thin-film type.

Sample media No. 11 to No. 14 were checked by the X-ray diffraction method. The results are shown in FIG. 10, which reveals that a peak intensity of the Cr—Ni crystals appearing in the vicinity of 2 θ=40 degrees becomes high as the negative bias voltage becomes large. It appears that the increased height of said peak intensity contributes to an improvement in crystal orientation of the magnetic layer.

As stated above, the provision of the crystalline alloy seed layer between the substrate and the ground layer gives (110)+(211) orientation to the crystals of the Cr ground layer to be formed on the seed layer and further substantially (100) orientation to the crystals of the Co alloy magnetic layer to be formed on the ground layer, whereby a great coercive force can be imparted to the magnetic recording medium.

Moreover, since the value of OR approaches unity the influence of the circumferential magnetic anisotropy is thus controlled notwithstanding that the medium is provided with an enhanced coercive force. Therefore, the reduced circumferential magnetic anisotropy of the magnetic layer diminishes nonlinear waveform interference to ensure improved recording-reproduction characteristics.

Thus, the magnetic recording medium of the metallic thin-film type according to the invention has an enhanced coercive force and also improved recording-reproduction characteristics even when the substrate is textured, and is therefore adapted to an increased recording density.

The present invention can of course be altered and modified by one skilled in the art without departing from the spirit and scope of the invention. Such alternations and modifications are included within the scope of the invention as defined in the appended claims.

What is claimed is:

1. A metallic thin-film magnetic recording medium, comprising:
  a Cr ground layer;
  a magnetic layer; and
  a protective film successively superposed on a nonmagnetic substrate,
  wherein a seed layer of a crystalline Cr—Ni alloy containing only Cr and Ni is formed between the substrate and the Cr ground layer.

2. The magnetic recording medium as recited in claim 1 wherein said crystalline Cr—N1 alloy consists essentially of, in atomic %, 36 to 46% of Ni and the balance substantially Cr.

3. A metallic thin-film magnetic recording medium, comprising:
  a Cr ground layer;
  a magnetic layer; and
  a protective film successively superposed on a nonmagnetic substrate,
  wherein a seed layer of crystalline alloy is formed between the substrate and the Cr ground layer, said crystalline alloy consisting essentially of, in atomic %, 36 to 46% of Ni, 0.5 to 3% of W or Mo or combination thereof, and the balance substantially Cr.

4. The magnetic recording medium as recited in claim 1 wherein a negative bias voltage is applied for the substrate when the seed layer is formed.

5. The magnetic recording medium as recited in claim 2 wherein a negative bias voltage is applied for the substrate when the seed layer is formed.

6. The magnetic recording medium as recited in claim 3 wherein a negative bias voltage is applied for the substrate when the seed layer is formed.

7. A metallic thin-film magnetic recording medium, comprising:
  a Cr ground layer;
  a magnetic layer; and a protective film successively superposed on a nonmagnetic substrate, wherein a seed layer of crystalline alloy is formed between the substrate and the Cr ground layer, whereby crystal orientation of the magnetic layer is substantially (100) orientation.

* * * * *